United States Patent [19]
Santen

[11] 3,814,234
[45] June 4, 1974

[54] DEVICE FOR TREATING CONTAINER-PACKED WARES AND CONVEYING UNIT FOR SUCH A DEVICE

[75] Inventor: Salomon Santen, Amsterdam, Netherlands

[73] Assignee: Stork Amsterdam N.V., Sportlaan, Amstelveen, Netherlands

[22] Filed: Sept. 26, 1972

[21] Appl. No.: 292,422

[52] U.S. Cl. ............................................. 198/143
[51] Int. Cl. ........................................... B65g 17/12
[58] Field of Search ........................... 198/140–152

[56] References Cited
UNITED STATES PATENTS
2,941,656   6/1970   Jackson ........................... 198/143
3,163,284   6/1970   Van Der Winden ............... 198/152

Primary Examiner—Richard E. Aegerter
Attorney, Agent, or Firm—Wigman & Cohen

[57] ABSTRACT

A conveyor for a continuous sterilizer, said conveyor comprising two parallel chains with a number of gutter shaped carriers each having a C-cross-section with a longitudinally extending opening; each carrier has a movable cover with locking means for retaining the cover in its closed and its open position.

3 Claims, 3 Drawing Figures

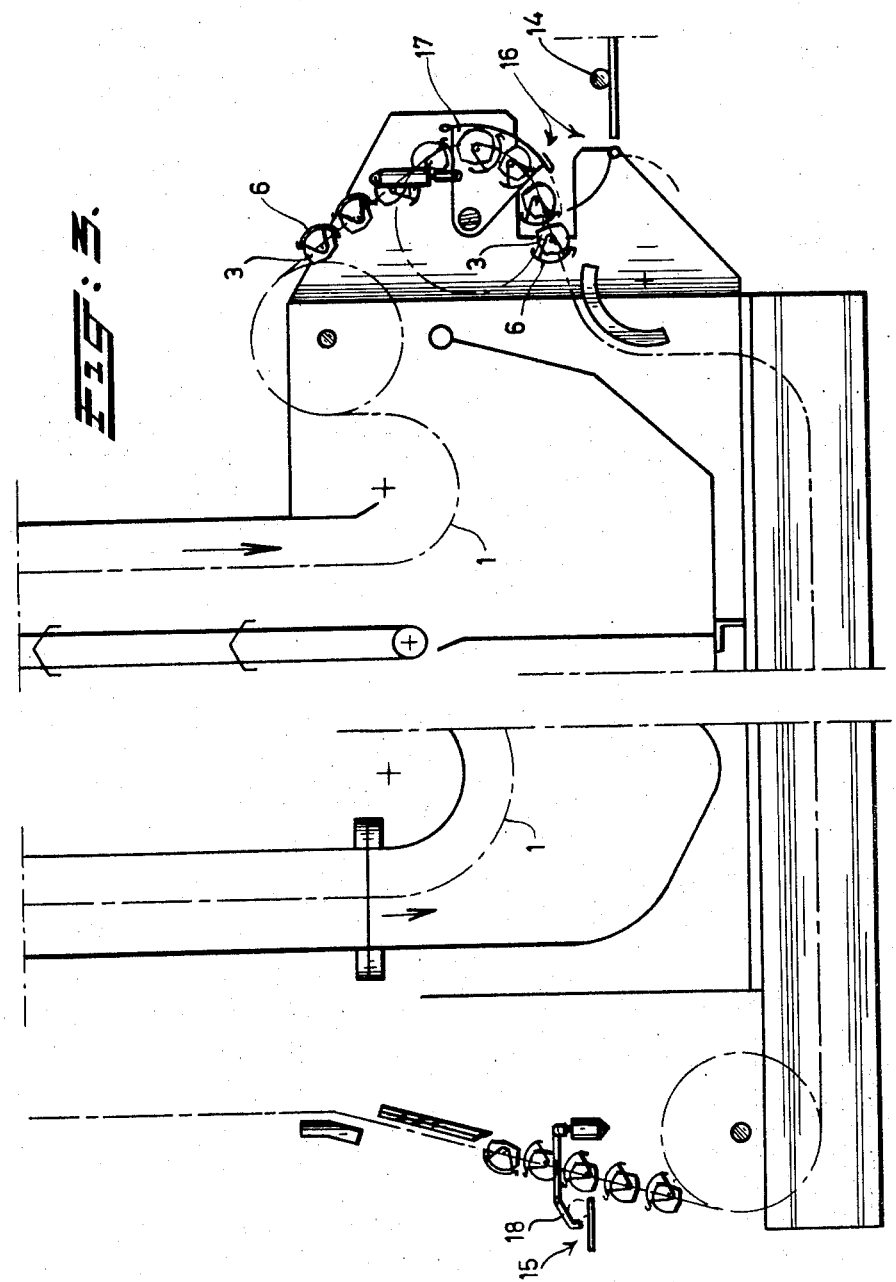

DEVICE FOR TREATING CONTAINER-PACKED WARES AND CONVEYING UNIT FOR SUCH A DEVICE

DISCUSSION OF THE PRIOR ART

My invention relates to a device for treating wares packed in containers, like a sterilizer or pasteurizer for foodstuff packed in tins, glass or plastic, comprising a treatment space and an endless conveyor advancing through this space, the conveyor consisting of two parallel chains with there between a number of oblong guttershaped carriers, which at their two ends are secured to a chain link and which are substantially of a C-section, the open front side of the C-section being parallel to the plane through the conveyor. Such a device, known from U.S. Pat. No. 3,163,284 is suitable for treating a great number of containers, since the gutter- or trough-shaped carriers are capable of taking up or delivering a stick of containers in a very short period.

This known device has the drawback that there are certain restrictions as to the shape of the path along which the conveyor traverses the treatment space. It should namely be provided for that the containers in each carrier do not leave the same when the carriers advance, since this could give rise to interruption in the operation. Within the treatment space the conveyor passes along a number of vertical loops, so that the open front side of the carriers is always directed sideways or upwardly and nowhere points downwardly. It may, however, occur that under particular circumstances a different shape of the path is advantageous, but that said shape cannot be applied owing to the risk of the containers leaving the carriers.

SUMMARY OF THE INVENTION

It is an object of my invention to provide a device preserving the advantages of the known carrier, but offering yet more liberty of choice as to the shape of the path along which the carriers should travel. This object is attained according to my invention by providing each carrier with a closing cover, capable of swinging between a closed and an open position, locking members being provided for retaining the cover in each of its two end positions. Due to these features an entirely closed carrier is obtained which obviously can assume any arbitrary position without the risk of the containers emerging therefrom. By swinging the closing cover the opening of the carrier is again available, so that a stick or a row of containers can be loaded into the carrier or discharged therefrom.

SURVEY OF THE DRAWINGS

FIG. 3 shows the lower part of the complete device.

DESCRIPTION OF A PREFERRED EMBODIMENT

Figure 1:
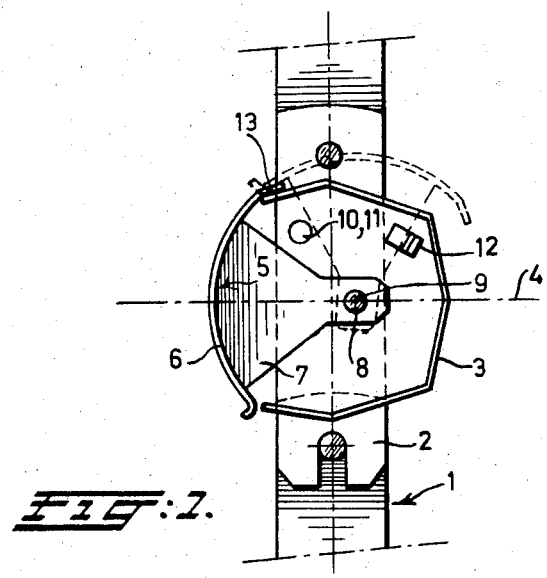
FIG. 1 is a side elevation of a carrier with several chain links.

The device is substantially identical to the one described in U.S. Pat. No. 3,163,284, so that the description hereinafter will be limited to the part in which the invention is embodied, viz. the conveyor.

The conveyor consists of two parallel chains 1, composed from links 2, between which are secured a plurality of oblong gutter-shaped carriers 3. As is clearly visible in FIG. 1 each carrier 3 has a symmetrical cross-sectional profile with a symmetry plane 4. This profile is substantially C-shaped in conformity to the aforementioned U.S. Pat. No. 3,163,284. The two ends of each carrier 3 are secured to a chain link 2 in such a way that the open front side 5 is parallel to the plane of the conveyor.

Each carrier 3 is provided with a cover 6 capable of swinging from a closed to an open position (and vice versa), in FIG. 1 represented by full lines or dotted lines, respectively. The closing cover 6 is provided with two side plates 7 which are each rotatably mounted on a stub shaft 8 secured in a chain link 2. The same stub shafts 8 serve to support the carrier 3 such that the sides of the carrier are slightly spaced from the associated links 2. The side plates 7 of the closing cover 6 are not only rotatably, but also to a limited extent, slidably mounted on the stub shafts 8, which is possible due to the abovementioned spacing between the sides of the carrier 3 and the links 2. This arrangement is seen best in FIG. 2. The stub shafts 8 have a centre line 9 situated in the symmetry plane 4 of the carrier 3.

The cover is held in each of its two end positions by means of locking members consisting of two pins 10 and 11, the first of which is secured to a chain link 2 at the one end of the carrier 3, while the other pin 11 is secured on the side of the other end of the carrier 3. Due to a shift in the longitudinal direction of the closing cover 6 (represented in dotted lines in FIG. 2) the cover is unlocked, so that it can turn from the one to the other end position, whereupon the cover slides back again and locks itself in its new end position. An abutment 12 is provided against the side of the carrier 3 in order to limit the open position of the cover 6, while the cover itself further shows a bent over edge 13 which can abut against the edge of the carrier 3 in order to limit the closed position of the cover 6. This cover has the shape of a cylinder segment (see FIG. 1) with a radius of curvature in the centre of which coincides with the centre line 9 of the stub shafts 8.

FIG. 3 shows a part of the lower end of a device in which containers 14, like tins, glass jars or plastic containers (for example so-called pouches) filled with liquid or solid foodstuff receive thermal treatment, the containers being accommodated in the carriers 3, 6. At this lower end a charging station 15 and a discharging station 16 are provided. The cover 6 clears the opening before the discharge station is reached, whereupon the conveyor negociates a curve such that the containers glide or roll from the carrier due to the force of gravity. A rotatably mounted closing segment 17 ensures that the containers leave the carrier, at an exactly determined time. At the charging station 15 a mechanically operated loading beam 18 is provided by which a row of containers 14 is periodically slid into a carrier 3. Beyond this station the cover 6 is swung into the closed position again and locked in the indicated manner.

The effect of the device according to my invention, in particular of the conveyor is as follows:

when the conveyor travels along the treatment path, the carrier 3 will always be closed due to the cover 6. When the discharging station 16 is reached, the conveyor is directed in such a way that the closing cover 6 tends to swing, due to its dead weight, towards the open position. At that moment the cover 6 is slid in a longitudinal direction, by means of an abutment (not shown), so that the side plates 7 clear the pins 10, 11. The cover 6 falls then towards its open position delimited by the abutment 12. Hereupon the cover is pushed back so that the side plates 7 are confined between the abutments 12 on the one hand and the pins 10, 11 on the other hand.

The conveyor then turns round a curve such that the opening 5 is fully or obliquely downwardly directed, so that the containers 14 may leave the carrier 3. Thereafter the conveyor advances, with the cover 6 in the opened position towards the charging station 15 in order to be subsequently moved into the correct position for taking up a new row or stick of containers. The conveyor is thereupon brought into a position in which the cover 6 tends to fall shut, whereupon this cover is again slid sidewise over the stub shafts 8 so as to release the lock from the pins 10 and 11. The cover falls shut, is slid back again and thereby locked in the closed position anew.

Actually it is also possible to open and close the cover 6 mechanically for example by securing a steering pin to the side of this cover, the pin being capable of engaging a guide path for opening of closing, this cover at the correct moment.

Figure 2:
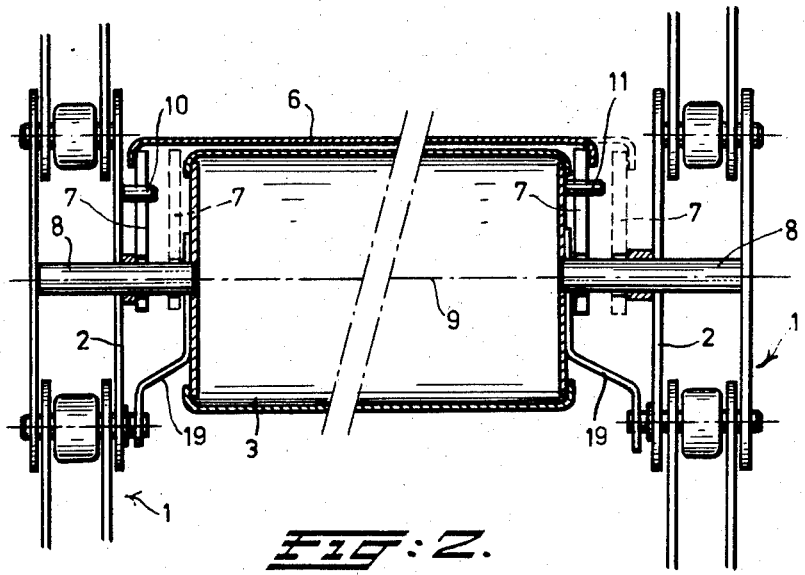
FIG. 2 is a front view of the carrier according to FIG. 1.

It should be noted that the locking and unlocking of the cover 6 can also be performed in a structurally different way than the one that is depicted in FIG. 2. In that case for example an intermediate plate 19 may be used by which each carrier 3 is secured to the links 2. It should further be noted that the substantial C-profile of each carrier 3 may also be flattened or stretched, provided a sufficient confinement of the containers is ensured. Each carrier may also show perforations or apertures in order to stimulate the flow of liquid through the carrier. In each carrier partitions may be provided so as to form pockets into each of which one or more containers may be accommodated.

What I claim is:

1. A device for treating wares packed in containers, such as a sterilizer or pasteurizer for foodstuff packed in tins, glass or plastic, comprising a treatment space and an endless conveyor advancing through said space in a path comprising at least one vertical loop, said conveyor consisting of two parallel chains with therebetween a number of oblong gutter-shaped carriers having two ends each of which is secured to a chain link, said carriers having a substantially C-shaped cross-section, the open front side of the C-shaped cross-section being parallel to the plane through the conveyor, each carrier being provided with a cover having two side plates rotatably and slidably mounted on a stub shaft secured to a chain link, said cover adapted to swing from a closed to an open position and vice versa, locking means for retaining the cover in each of its two end positions, said locking means consisting of two pins one of which is secured to the chain link at the end of the carrier and the other one being secured on the side of the other end of the carrier, and means for axially shifting said cover over said stub shafts in order to lock or unlock the cover.

2. A device according to claim 1, each carrier having a symmetrical cross-sectional profile, the cover swinging around a centre line situated in the symmetry plane of the carrier, the cover having the shape of a cylinder segment the centre of the radius of curvature of which coincides with the aforementioned centre line.

3. An unit constructed from a gutter-shaped carrier secured at both ends to a chain link, obviously destined for composing a conveyor for the device according to claim 1, said unit having a movable cover for the longitudinally extending opening of the carrier.

* * * * *